E. CAVENDY.
Altitude Instrument.
No. 18,572.
Patented Nov. 10, 1857.
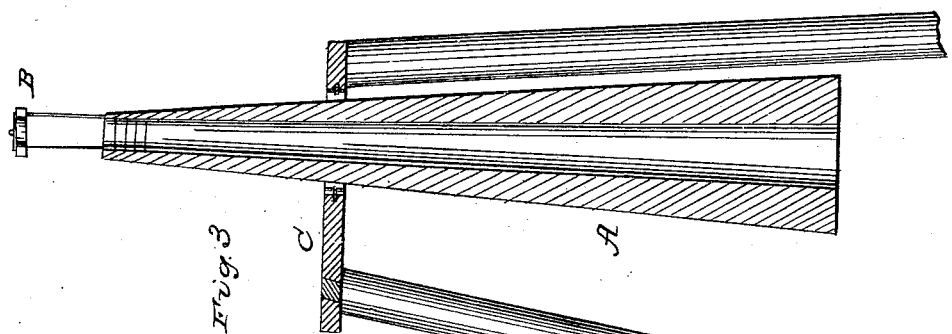
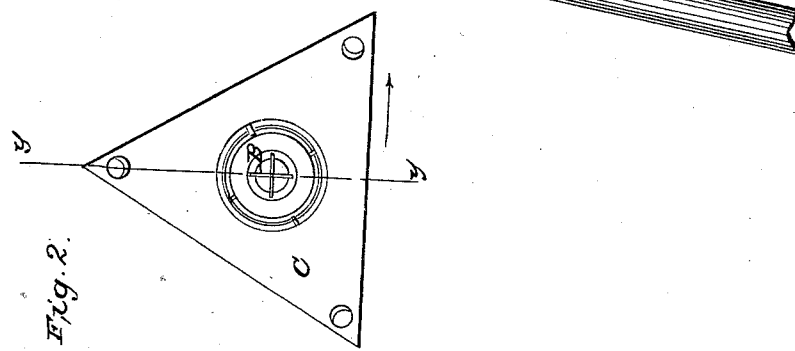
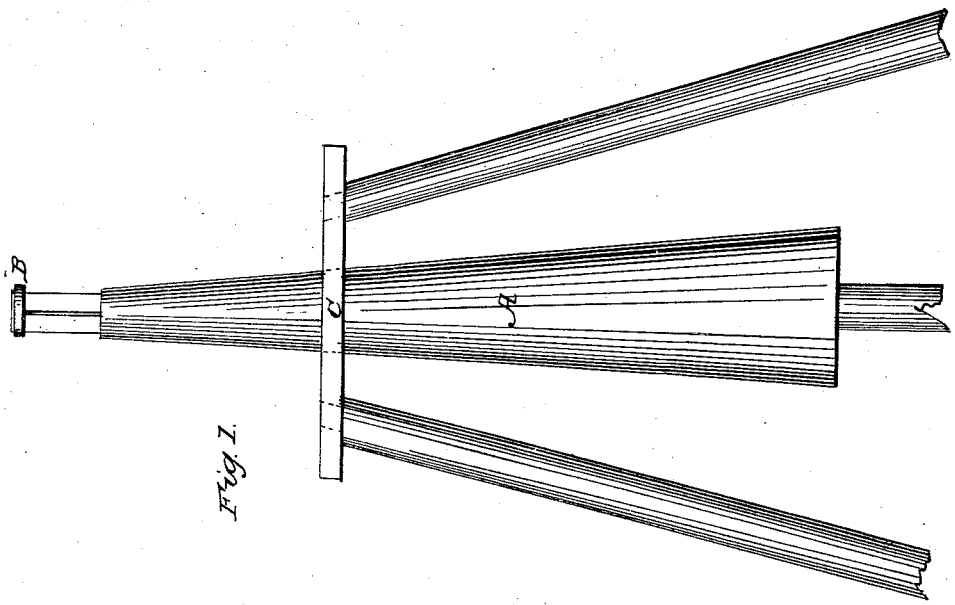

UNITED STATES PATENT OFFICE.

EDWARD CAVENDY, OF NEW YORK, N. Y.

METHOD OF DETERMINING APPROXIMATE LATITUDE AT SEA.

Specification of Letters Patent No. 18,572, dated November 10, 1857.

*To all whom it may concern:*

Be it known that I, EDWARD CAVENDY, of the city, county, and State of New York, have invented a new Nautical Instrument, which may be properly termed a "Zenith-Indicator;" and I do hereby declare that the following is a full and exact description thereof, reference being had to the accompanying drawings, making a part of this specification, Figure 1 being a side view of said instrument; Fig. 2, a top view of the same, and Fig. 3 a section in the line $y\ y$ of Fig. 2.

Similar letters indicate like parts in each drawing.

It is well known to all nautical men that the altitude of a perfectly visible meridian sun, cannot always be ascertained, for the reason that the horizon is frequently obscured by a foggy or misty atmosphere when the sky overhead is quite clear. To enable the true position of the sun to be ascertained under such circumstances, I have invented the aforesaid instrument; by the aid of which I am enabled to measure, with a sextant or quadrant, the number of degrees that the sun is below the zenith at the instant that it attains its extreme altitude.

My zenith indicator is composed of a tube A, which is suspended in a self-adjusting vertical position at such a height that the observer can stand beneath its lower end, and with his quadrant, or sextant, reflect the sun to a point in the heavens, directly over the axis of said tube; when by the appearance of the shadow thrown into the upper end of said tube, from a ring placed a short distance above the same, he is enabled to indicate the very instant that the sun attains its highest altitude and to measure the number of degrees that the sun, at the said instant of time, is below the zenith; which sum, when deducted from 90 degrees, will give the exact altitude of the sun above the horizon.

When the aperture at the upper end of the tube A, is one inch and a quarter in diameter, and the tube is three feet in length, with its inner periphery gradually enlarging from its upper to its lower end, I find that three inches is the proper distance to elevate the shadow-throwing ring B, above the upper end of said tube.

The accompanying drawings represent the tube A, as suspended by gimbals placed within an aperture in the top C, of a tripod. The tube should be so proportioned, poised, and adjusted, that it will oscillate the least possible degree from a vertical position when its supporting frame is set upon the deck of a moving vessel.

The instant at which the sun attains its greatest altitude may be ascertained by the length of the shadow thrown into the mouth of the tube A; and this may be noted and reported by an assistant observer to the principal observer, who may at the time have his eye upon the reflected image of the sun at the zenith. To enable the observer, or his assistant, to accurately observe the extreme point to which the shadow descends into the mouth of the aforesaid tube, a series of horizontal lines may be formed on the inner periphery of said tube from its mouth downward for a suitable distance.

It may be found in practice that the shadow-throwing ring B, may not be an indispensable feature of my new nautical instrument; but as at present advised, I am of the opinion that the shadow thrown by said ring into the mouth of the suspended tube, enables an observer to more readily and accurately apprehend the point of time at which the sun attains its extreme altitude.

What I claim as my invention and desire to secure by Letters Patent, is—

The hereinbefore described method of determining approximately the zenith of the observer under the circumstances set forth.

The above specification of my new nautical instrument, signed and witnessed this 31st day of July 1857.

EDWD. CAVENDY.

Witnesses:
 Z. C. ROBBINS,
 GEO. W. ADAMS.